Figure 1:
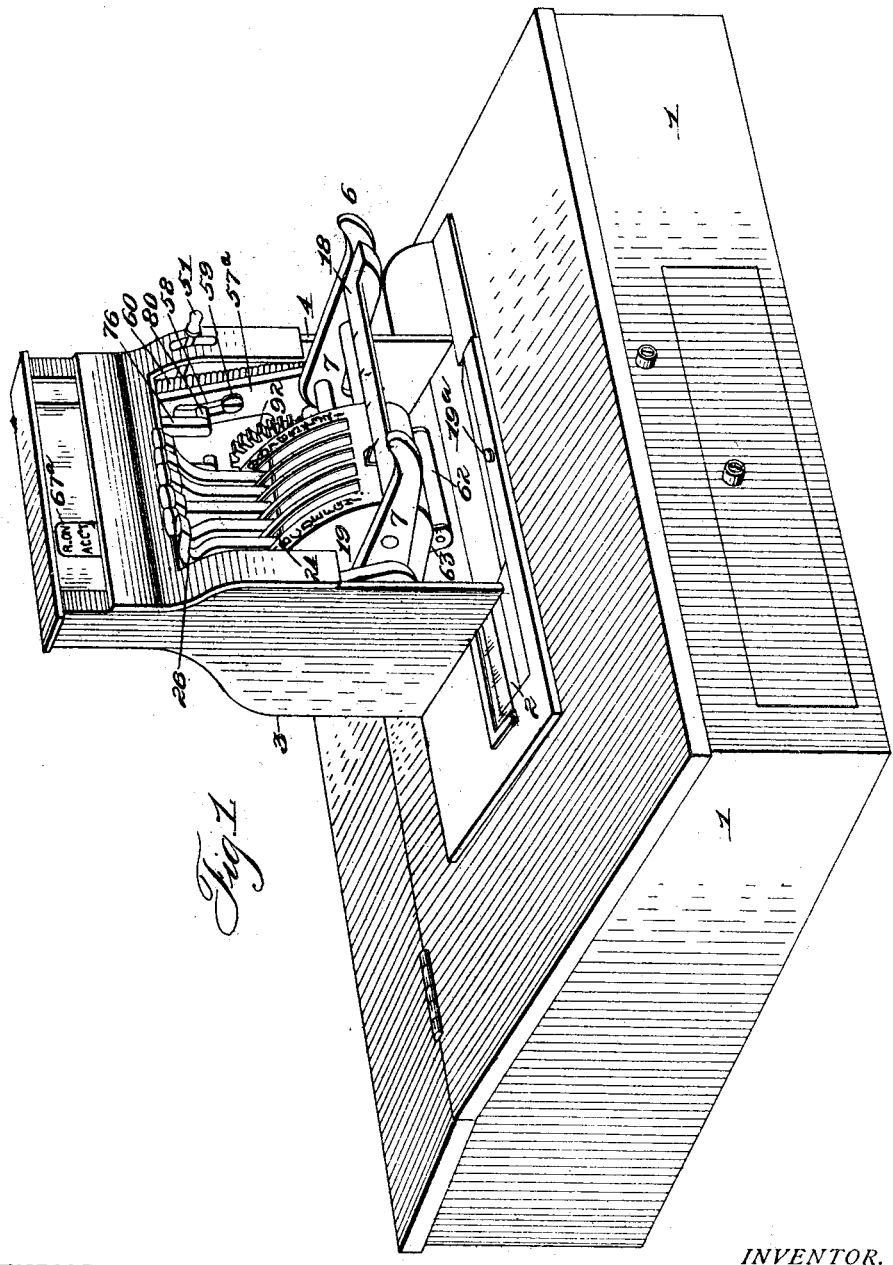

J. P. CLEAL.
CASH REGISTER.
APPLICATION FILED JUNE 6, 1898.

1,080,001.

Patented Dec. 2, 1913.
8 SHEETS—SHEET 1.

WITNESSES:
Wm. McCarthy
Wm. H. Muzzy

INVENTOR.
Joseph P. Cleal,
BY Alvan Macauley
ATTORNEY.

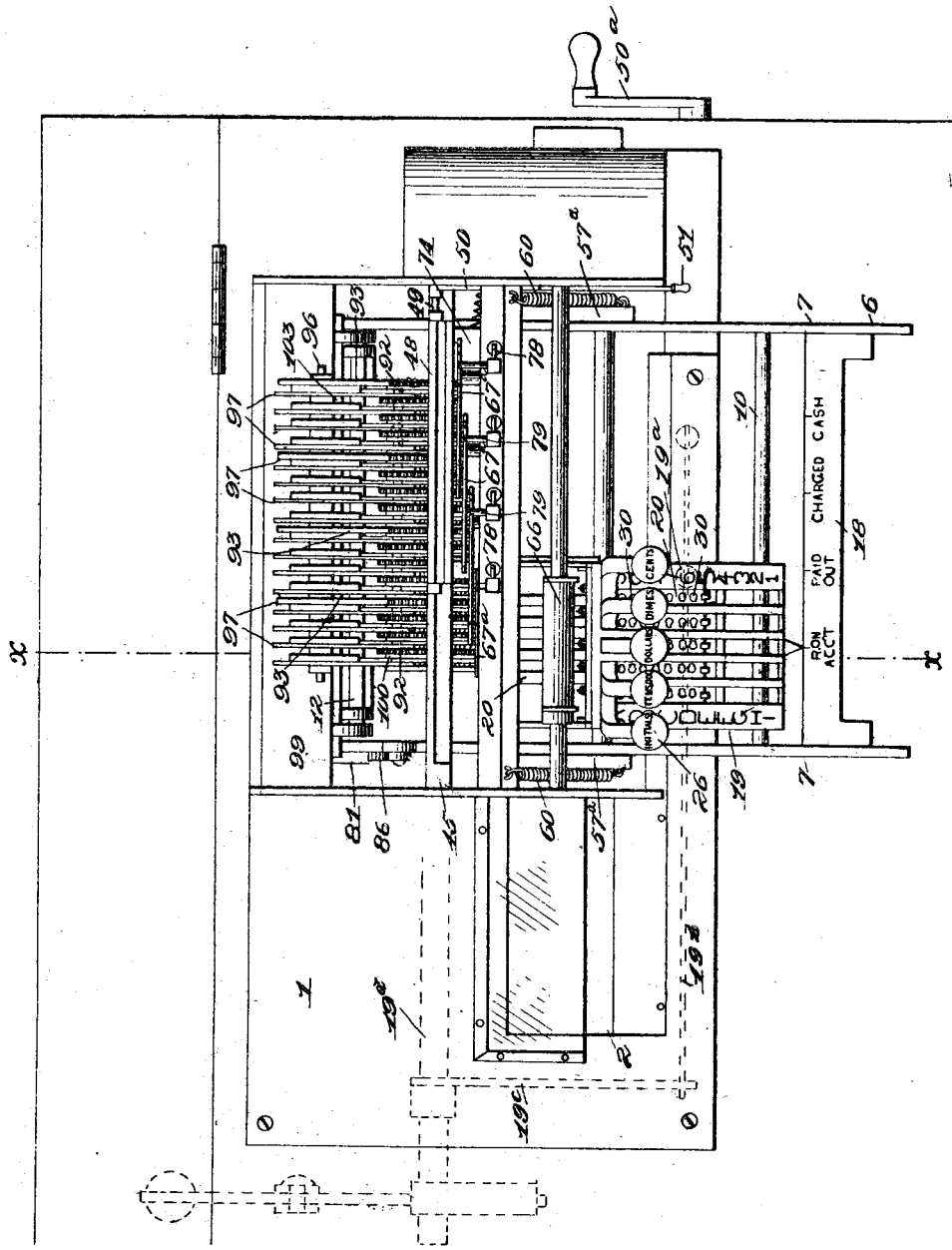

J. P. CLEAL.
CASH REGISTER.
APPLICATION FILED JUNE 6, 1898.
1,080,001.
Patented Dec. 2, 1913.
8 SHEETS—SHEET 3.
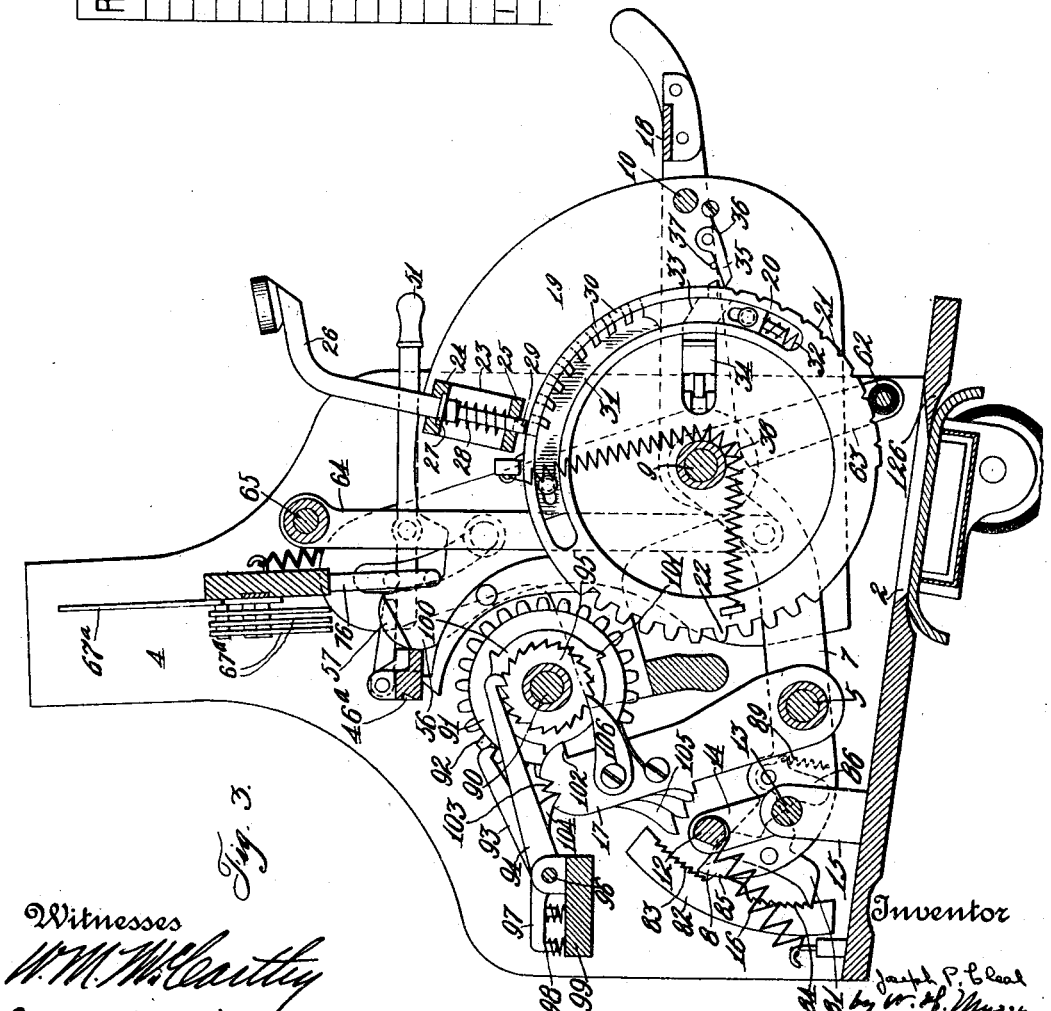

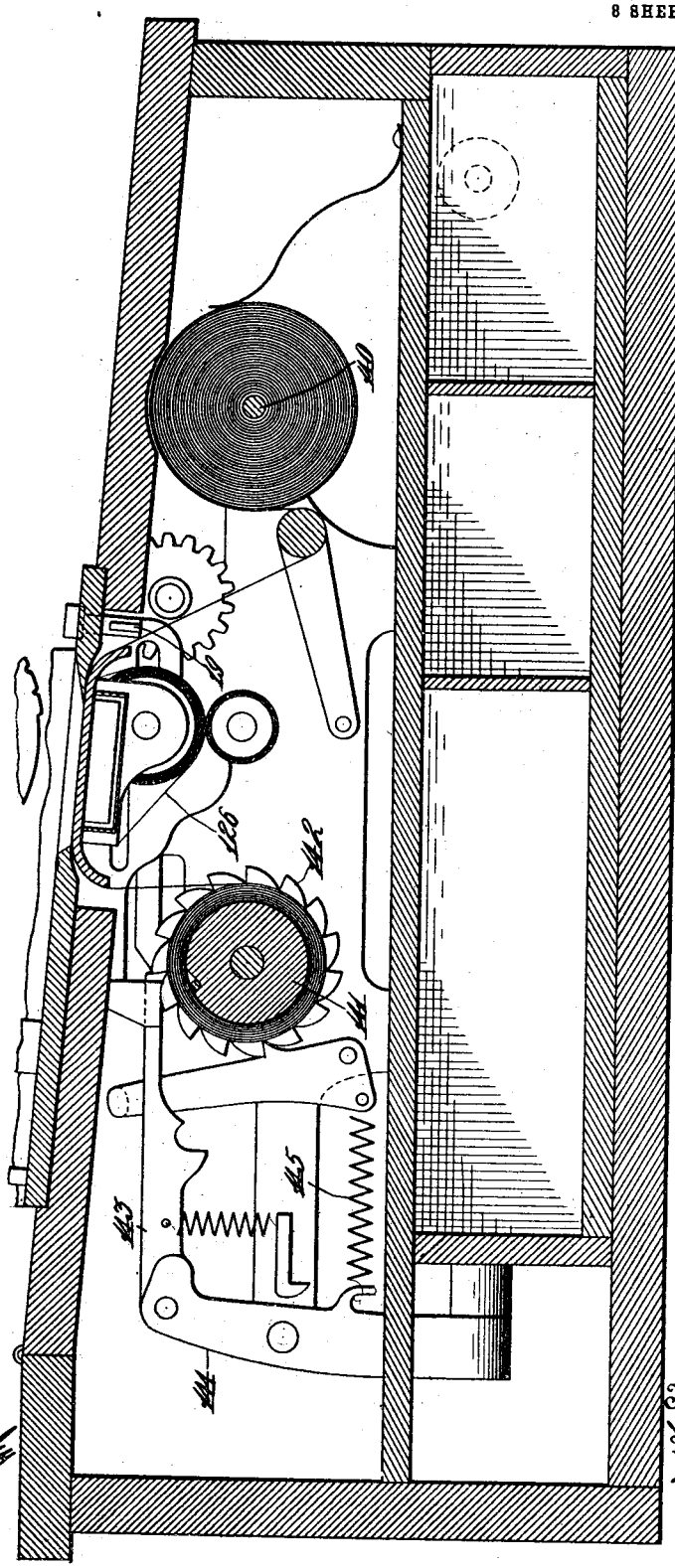

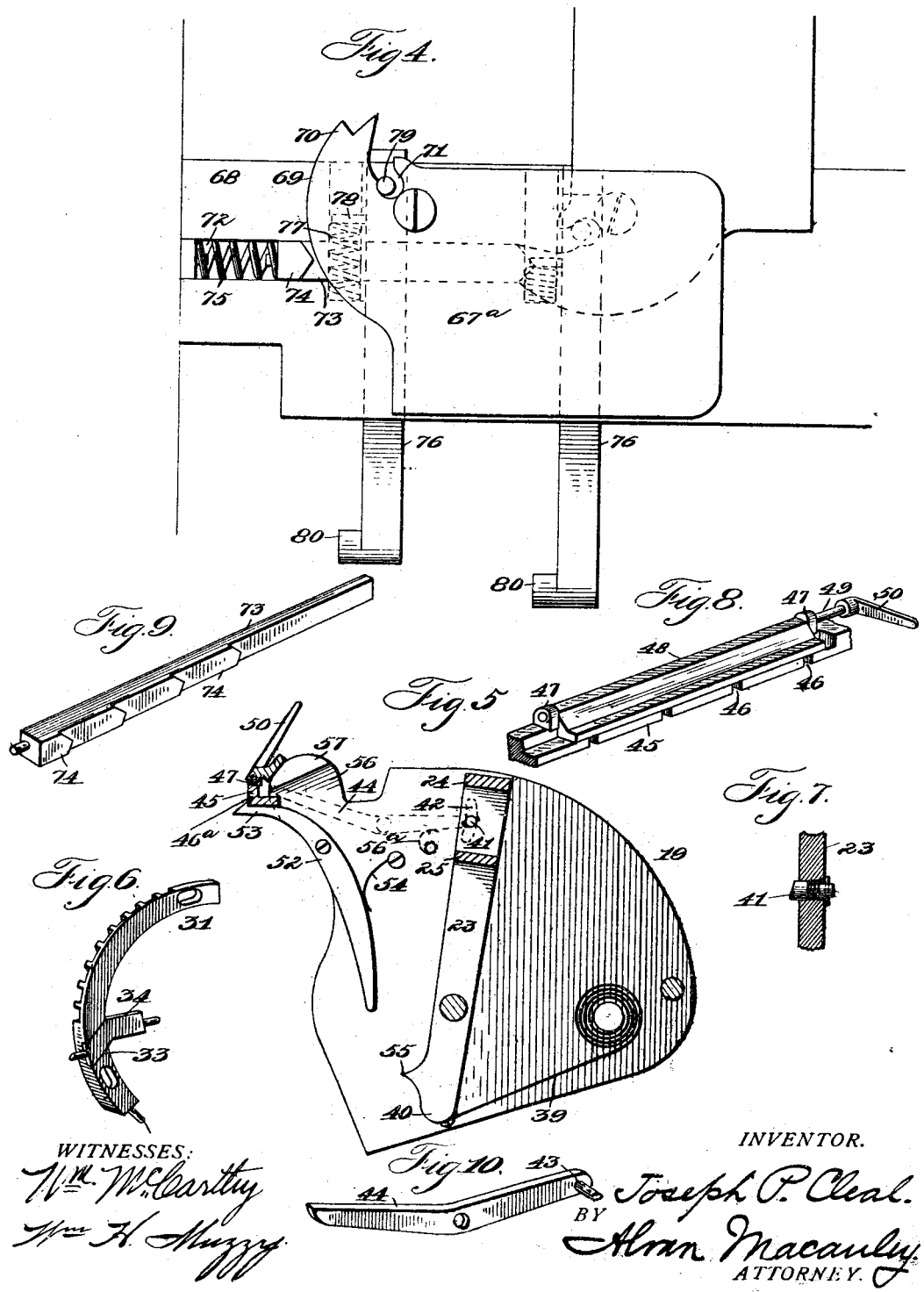

J. P. CLEAL.
CASH REGISTER.
APPLICATION FILED JUNE 6, 1898.
1,080,001.
Patented Dec. 2, 1913.
8 SHEETS—SHEET 6.
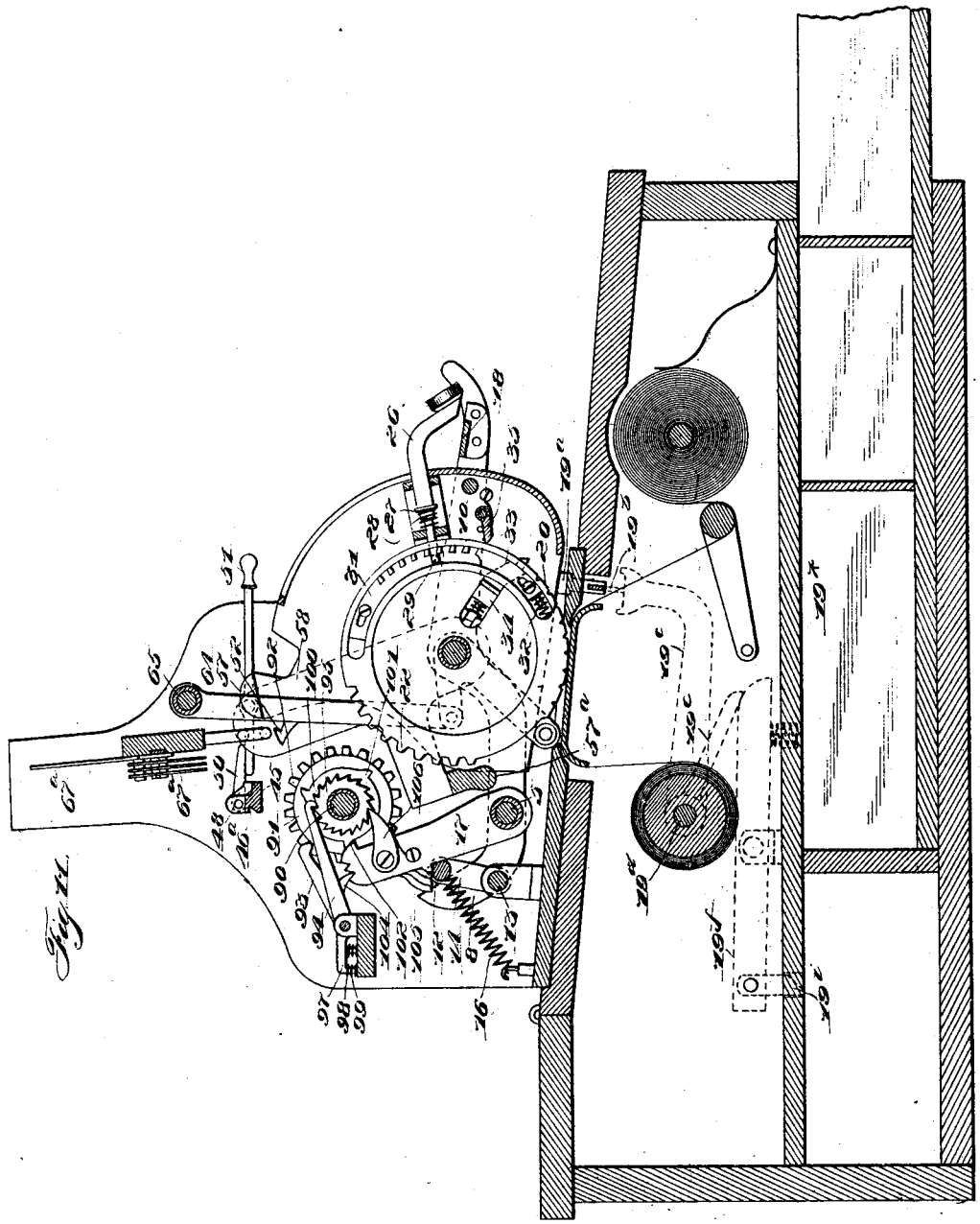
WITNESSES:
INVENTOR.
Joseph P. Cleal.
BY
Alvan Macauley.
his ATTORNEY.

J. P. CLEAL.
CASH REGISTER.
APPLICATION FILED JUNE 6, 1898.
1,080,001.
Patented Dec. 2, 1913.
8 SHEETS—SHEET 7.
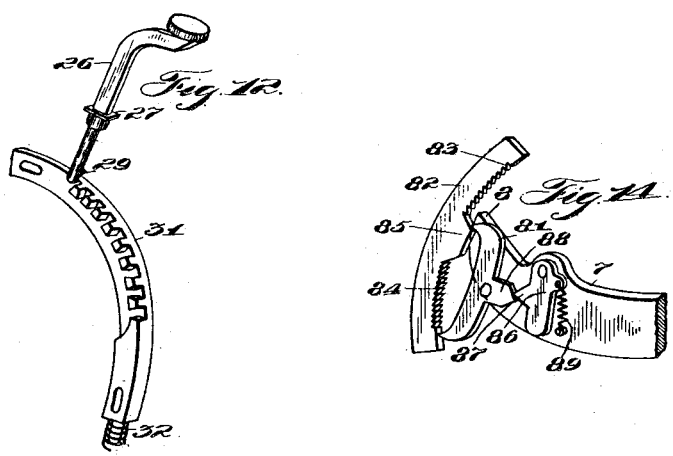
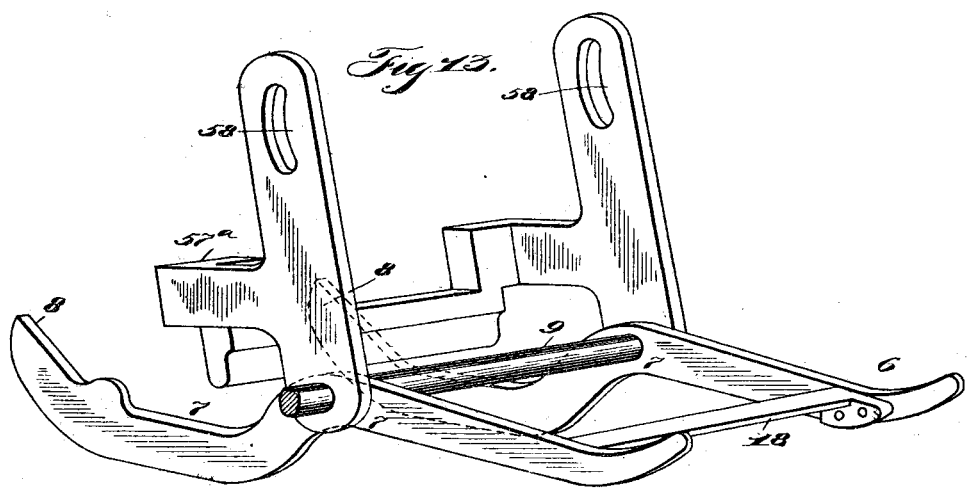
WITNESSES:
INVENTOR.

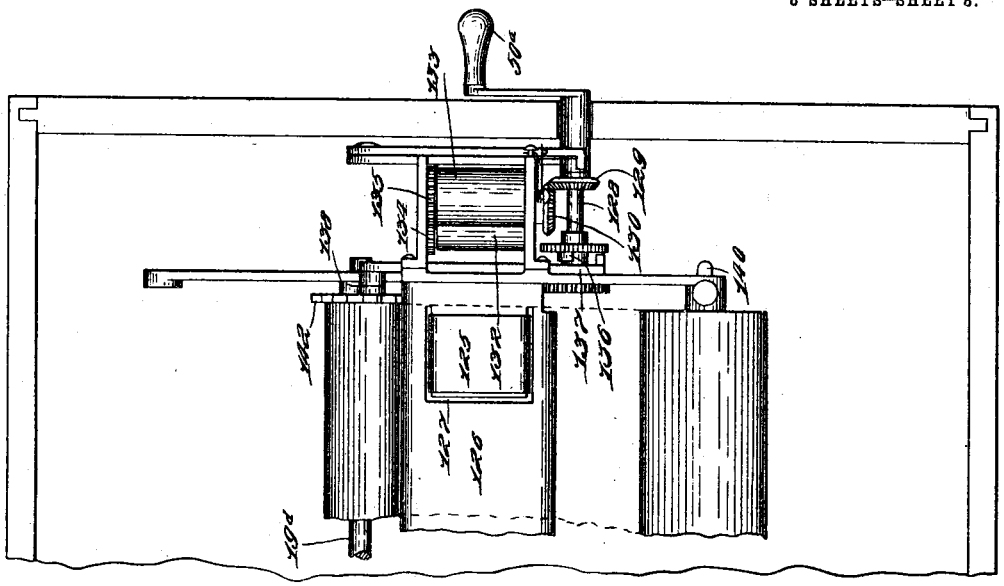
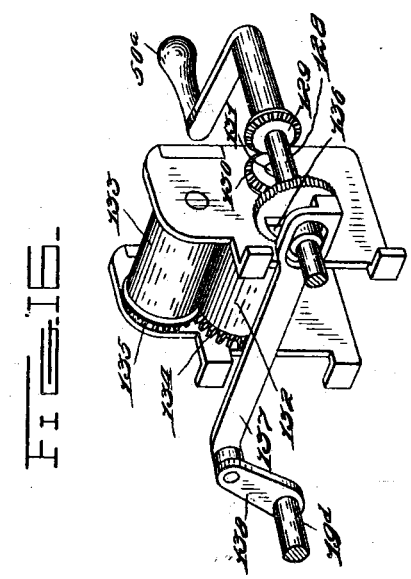

UNITED STATES PATENT OFFICE.

JOSEPH P. CLEAL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,080,001.          Specification of Letters Patent.          Patented Dec. 2, 1913.

Application filed June 6, 1898. Serial No. 682,725.

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

The invention relates to improvements in cash registers and indicators and has more particular relation to that class of machines in which a segregation of amounts belonging to special classes of transactions or departments is effected.

One of the several objects of the invention is to provide means for registering the amounts of the transactions upon ony one of a series of independent totalizers by means of a single totalizer operating mechanism.

Another object is to provide mechanism for keeping a printed record of the amounts of the transactions in their segregated form.

The invention is shown as applied to a machine of the manual autographic type patented in the United States to Jos. P. Cleal on February 27, 1894, and numbered 515,517.

With these and incidental objects in view, the invention consists in certain novel features of construction and combinations of parts, the essential elements of which are set forth in appended claims and a preferred form of embodiment of which is hereinafter described with reference to the drawings which accompany and form part of this specification.

Figure 1, represents a perspective view of the devices embodying my invention applied to a machine of the class above mentioned. Fig. 2, represents a top plan view of the same with the top, back and front portions of the casing removed to expose the interior. Fig. 3, represents a vertical transverse section looking to the right from the line $x$—$x$ of Fig. 2. Fig. 3ª, represents a plan view of a portion of the record strip. Fig. 3ᵇ is a vertical transverse section of the lower part of the machine on line X—X of Fig. 2. Fig. 4, represents an enlarged detail rear elevation of a portion of the indicators and their operating mechanism. Fig. 5, represents an enlarged detail vertical section through the frame of the printing device showing the locking mechanism mounted thereon. Fig. 6, represents an enlarged detail perspective view of one of the key locking slides and its operating spring pressed stud or pin. Fig. 7, represents an enlarged detail vertical section of a portion of the key frame and its spring pressed locking stud. Fig. 8, represents an enlarged detail perspective view of the locking bars with the operating lever. Fig. 9, represents an enlarged detail perspective view of the locking bar for the indicator tablets, and Fig. 10, represents an enlarged detail perspective view of the trip lever for the key frame and Fig. 11 represents a view similar to Fig. 3, some of the parts being omitted for clearness, with the devices in a different position and also including the drawer latching devices. Fig. 12 represents an enlarged detail perspective view of one of the operating keys and one of the key locking segments or slides. Fig. 13 represents a detail perspective view of the main operating frame and its coöperating yoke. Fig. 14 represents an enlarged detail perspective view of the full stroke pawl and coöperating rack. Fig. 15 represents a partial top plan view of the crank handle check feeding rollers and coöperating parts and the table over which the detail strip and check strip pass, and Fig. 16 represents a detail perspective view of the operating crank handle, gears operated thereby, feed rollers and connection between the crank handle and main rock shaft.

As many of the parts illustrated in connection with the invention to show the application of the same, have been previously protected by the above mentioned patent, the same will be referred to for detail description of such parts.

The casing 1, as shown in the drawings is constructed substantially in accordance with the aforesaid patent with the exception that the slot or opening 2 of the same is somewhat longer than that shown in said patent. The devices constituting the present improvements are mounted upon the casing 1, so as to extend over a portion of the slot 2, by means of an auxiliary casing comprising side plates 3 and 4 and suitable back, top and front portions connecting the same. A rod or shaft 5, is mounted in said casing near its bottom and forms a support for an operating frame 6, upon which the keys and printing mechanisms are supported. This operating frame comprises side bars 7, 7 journaled on the shaft 5, and having upwardly turned ends 8, 8 and connected by rods 9 and 10. The said ends 8, 8 are adapted to coöperate with a rock frame to throw the same forward when the forward portion of the frame 6 is depressed. The said rock frame comprises two bars or rods 12 and 13 connected at their ends by link bars 14, 14 and journaled by means of the said rod 13 in small bearing blocks 15 secured to the top of the base of the casing. The ends of the upper rod 12 extend beyond the link bars and are held normally against the upwardly turned ends 8, 8 of the bars 7, 7 by coil springs 16, 16 which are secured to said rod 12, and also to suitable hooks mounted on the base plate.

It will be observed from the above description that any depression of the forward end of the frame 6, will result in a corresponding forward movement of the bar 12, of the rock frame, and consequent operation of the arms 17, 17, of the registering mechanism as hereinafter described. As before stated the side bars 7, 7, of the frame 6, are connected by rods 9 and 10, and also by a finger bar 18, which latter is provided with suitable marks or letters on its surface at predetermined points for indicating the points to which the sliding key and printing mechanism, hereinafter described, is to be adjusted. The said rods 9 and 10 form guides and supports for a casing 19, within which are mounted a plurality of printing type wheels 20. These wheels are journaled on the rod 9 and are each, excepting one, provided with a plurality of peripheral printing type 21, and a plurality of cog teeth 22, the latter being adapted to mesh with the cog wheels of the registering mechanisms, hereinafter described. The excepted wheel which is located at the end of the series is provided with a plurality of indicating type for printing an identifying character for the operator concerned in the transaction being recorded. A swinging frame 23 is mounted within the casing 19, and is so journaled upon the rod 9 as to straddle the wheels 20 over which it is adapted to operate. This frame comprises side bars journaled upon the rod 9 and spaced cross bars 24 and 25 connecting the outer ends of the same and formed with apertures for the passage of the shanks of keys 26. Four of these keys represent respectively units of cents, tens of cents, units of dollars, and tens of dollars; the remaining key representing the indicating character for the person making the transaction and adapted to operate the corresponding printing wheel. The type wheels corresponding with the keys are similarly marked with units of cents, tens of cents, units of dollars, tens of dollars and a plurality of letters or other indicating characters. Near one edge of the front of the casing 19, are consecutively arranged a plurality of figures ranging from one to nine while near the opposite edge are arranged a plurality of letters ranging from A to I, but extending so as to read consecutively in an opposite direction from the figures. The shank of each of the keys 26 is provided with a nut or enlargement 27, so mounted thereon as to normally contact with the under side of the bar 24 and thus limit the outward movement of the key. Each key shank is further provided with a coil spring 28, which surrounds the same and bears with its opposite ends against the bar 25, and the nut 27, for normally holding the latter against the bar 24. Laterally projecting pins 29 having beveled sides are mounted upon the lower ends of the said key shanks and are adapted, together with the ends of said shanks to be forced through key hole apertures 30, 30, formed in portions of the peripheries of the aforesaid printing wheels.

It will be observed from the above that the frame 23, may be swung to any desired position in relation to the key hole apertures of the printing wheels and any of the keys then depressed to cause their shanks to enter the desired key holes to lock the respective printing wheels to move with said frame and thus bring the proper type into printing position. In recording any desired amount the keys are first adjusted into alinement with the desired number or letter and the proper key then depressed. The keys are locked in their depressed positions by the pins 29 engaging with laterally projecting beveled faced lugs formed on segmental slides 31, which latter are mounted in the respective printing wheels. Each of these slides is normally held forward with its lugs projecting over a portion of the key hole apertures by one of a series of coil springs 32 bearing against said slide and a portion of its respective wheel. When any one of the keys is depressed its pin 29 first passes through its key hole aperture 30, and engages one of the beveled projections of its respective segmental slide thus forcing the same momentarily out of register with the apertures 30. The continued downward movement of the key causes the pin to pass beneath the projection of the slide and allows the latter to assume its normal position so as to prevent the upward movement of said key. After the printing has been accomplished it becomes necessary to release the respective keys to permit them to assume their normal positions and to effect this result each of the slides is formed with an incline groove 33 into which extends the angular end of one of a series of short spring pressed bars 34 mounted in the respective printing wheels.

It will be seen from the above that when the said spring pressed bars are in their normal positions the projections of the slides extend partly over the key hole apertures but that when any one of said bars is forced inward that the respective slide will be moved to cause its projections to pass out of alinement with the said key hole apertures. One end of each of the bars is inclined as shown and projects slightly beyond its respective printing wheel so as to normally lie in the path of a plate 35 pivotally mounted in the casing 19, and having its forward edge beveled and normally held up against a stop pin 37, by a spring 36. When the printing wheels are rotated after the keys have been locked thereto, the projecting ends of the bars 34 pass below the plate 35 forcing the same backward against the tension of its spring but upon the reverse movement of said wheels the plate 35 upon being forced upward is arrested by the pin 37, and the said bars 34 are thus forced inward to operate the slides and release the keys.

Each of the printing wheels is further provided with a coil spring 38, connected thereto and passing about the shaft 9 with its opposite end connected to a portion of the casing. By this arrangement of the springs the forward movements of the printing wheels will put said springs under tension so that when the wheels are released they will be returned to their normal positions. The pivoted frame carrying the keys is held up in its normal position by a coil spring 39, one end of which is secured to the casing 19, and the opposite end to the lower pendent end 40 of one of the side bars 23. When the frame is depressed the spring is put under greater tension so that when said frame is released it will at once return to its normal position. The said frame is further provided in one side with a spring pressed locking stud 41, which projects into a segmental slot 42 formed in the casing 19, when the key frame is in its upper position, and thus locks said frame against movement until said stud is forced backward. This disengagement of the stud from the slot is effected by the bevel end of a pin 43 projecting into said slot 42, and mounted upon a pivoted trip lever 44 fulcrumed on the side of the casing 19, and operated by engagement with an angular cross bar 45 secured between the sides 3 and 4, and formed with a plurality of spaced recesses or notches 46 and a groove 46ª. This cross bar is further formed with two spaced apertured lugs 47 between which is pivoted an angular stop frame 48 which is adapted to fit snugly down over the bar 45. One of the journal ends of the said frame 48 is extended as at 49 and provided with an operating arm 50. This arm is adapted to be raised by a pivoted lever 51 (see Fig. 3) mounted on the side 4 and projecting from the front of the casing so that it may be grasped by the fingers to be operated. When said frame 48 is raised as above described the notches 46 which have been blocked by the same become clear so that a projection 56 of the casing 19, and hereinafter described may enter either one of said notches under the impulse of springs 60 and thus cause the register operating gears to mesh with the counter gears 92 also hereinafter described. A latching lever 52 is pivoted on the side of the casing 19 and is formed at its upper end with a hook 53 which is normally forced forward so as to enter groove 46ª and engage the bar 45, by a spring 54 also mounted on said casing. The extended end 40 of the side bar 23 is formed with a nose 55 to disengage the hook end of the lever 52 from the bar 45. One of the sides of the casing 19 is formed with an extension 56 having a laterally projecting portion 57, and adapted to fit into any one of the recesses 46 to permit the hook 53 to pass far enough to the rear to catch over the bar 45. When the said hook is engaging the said bar, the frame 6 is, of course, locked against movement but the key frame is free to be operated as the end of the lever 44 has been raised thus forcing the incline end of the stud 43 against the movable stud 41, and pushing the latter out of the slot 42. As the key frame approaches the lower limit of its movement the nose 55 contacts with the lower end of the lever 52, and thus forces the hook 53 away from the bar 45 to permit of the frames 6 and 19 being moved downward. This latter movement permits the frame 48 to drop upon the bar 45 and also releases the rear end of the lever 44 so that its forward end carrying the stud 43 may be raised into the upper end of the slot 42 by a spring 56ª mounted on the casing 19. Such movement of the said lever 44 withdraws its pin out of the path of the spring pressed pin 41 so that when the key frame returns to its normal position it will be locked by said pin 41 passing into the slot 42. This return movement of the said frame 6 is effected by an auxiliary guiding and strengthening frame or yoke 57ª, (see Fig. 11) the opposite ends of which are journaled on the extended ends of the shaft 9. Extension slotted arms 58 are formed on this yoke and are guided in their reciprocations by pins 59, which pass through the slots of the same. and screw into the sides 3 and 4. The journaled ends of the yoke are connected to the aforesaid sides 3 and 4 by coil springs 60, so that the frame 6 will return to its normal position whenever released. The types when brought into printing positions as above described are inked by an inking roller 62 which is journaled between the lower ends of two bell crank levers 63 mounted loosely upon the shaft 9 within the casing 19. One arm of each of these bell crank levers is pivotally connected to one of two link bars 64, the upper ends of which are loosely mounted upon a transverse shaft 65, and held a predetermined distance apart by an interposed sleeve 66. By this structure the said bars 64 may be moved laterally with the casing 19 and still remain journaled upon the shaft 65, so that the depression of the casing 19 with consequential downward movement of the shaft 9, will operate the bell cranks and cause the inking roller to be passed over the types.

It will be observed from the foregoing description that the casing 19 may be moved laterally upon the shaft 9 into alinement with any one of a series of registering devices representing the different transactions and hereinafter described, and then allowed to pass forward by the tipping of the frame 48 so that the gear teeth 22 pass into mesh with the operating gears of the said registering devices, by operating the lever 51 to raise the frame 48 and allow the projection 56 to pass into one of the notches of the bar 45. The indicator tablets 67ª which represent respectively the different characters of transactions which the machine is capable of registering are pivotally mounted upon a transverse frame 68 connecting the two sides 3 and 4 and are each formed with a cam extension 69 having a notched end 70 and also with a recess 71. The said tablets are so pivoted and spaced that they overlap as shown in the drawings but in no wise interfere with each other. The said frame 68 is formed with a longitudinal groove 72 in which is mounted a slidable bar 73 having a plurality of projections 74 lying in different vertical planes so that their incline ends will normally contact with the curved extensions 69 of the respective tablets. This normal engagement of the said projections 74 with the extensions 69 is effected by a coil spring 75 mounted in the groove 72 between its end and the bar 73. The frame 68 is further provided with a plurality of vertically movable bars 76 normally held in elevated positions by coil springs 77 mounted in recesses formed in the frame 68 and bearing respectively against laterally projecting arms 78 mounted on said bars 76. Pins 79 mounted on the upper ends of the bars 76 project into the respective recesses 71 of the indicating tablets and are adapted upon the descent of the bar carrying the same, to move the tablet on its pivot and bring it into vertical exposed position. The descent of said bars is effected by means of laterally projecting lugs 80 mounted on the lower ends of the same and adapted to be engaged respectively by the incline under side of the projection 57, according to the position of the casing 19, and upon the forward movement of the same. When any one of the tablets is swung on its pivot as above described its cam extension 69 engages its respective projection 74 of the slide 73 and moves the latter longitudinally against the tension of its spring until the notched end 70 of said cam extension is opposite the said projection 74 when said slide is released to allow the projection to enter the notch and hold the tablet in its elevated indicating position. When the locking slide is moved by the cam extension of any of the tablets, the tablet which occupies a vertical position is released and allowed to drop to its normal horizontal position while the new tablet is elevated to its vertical indicating position.

In order to prevent any fraudulent or partial operation of the machine and to compel a complete stroke of the frame 6 at each operation, a double acting pawl 81 is pivotally mounted upon one of the ends 8 of the arms 7 and is adapted to coöperate with a segmental rack 82 rigidly secured to the side 3. This rack is formed on its inner periphery with two rows of teeth 83 and 84 inclined respectively in opposite directions and adapted to be engaged by the respective ends of the pawl 81 according to the direction of its movement. The said pawl is rocked on its pivot to effect this change of engagement from one set of teeth to the other by a lug or projection 85 mounted on said rack 82 in such manner as to be engaged by the curved operating ends of the pawl at the limit of each of its movements. The pawl is held under spring pressure in the position to which it is moved by the projection 85, by a pivoted stop 86 mounted upon the said side bar 7 and formed with an approximately V shaped nose 87, which engages a similarly shaped nose 88 formed on the pawl 81. A coil spring 89 connects the stop 86 with the aforesaid side bar 7, so that the pawl 81 is held under spring pressure when in either of its positions.

It will be seen from the above that as the forward end of the frame 6 is depressed the lower end of the pawl 81 rides over the teeth 84 and thus prevents any reverse movement of the frame until the pawl has been tripped by striking the projection 85.

The registering mechanisms for the different departments represented on the bar 18 are identical and I will therefore describe one of such mechanisms only. A transverse shaft 90 forms a journal support for the registering wheels 91 which are loosely mounted thereon. There are preferably five of these wheels, each formed on its periphery with three groups of figures; said groups including respectively figures from one to nine inclusive. Each of said wheels excepting one is further formed with peripheral gear teeth 92, which are adapted to mesh with the teeth 22 of the wheels 20, when the latter are thrown back. By this means, it will be observed, the registering wheels are turned to a degree corresponding to the movements of the respective wheels 20 by their keys as before described, and held in these positions against any accidental displacement by stop pawls 93 and 94. The pawl 93 engages the teeth 92 of the end registering wheel while the pawls 94 engage the teeth of ratchet wheels 95 fast to the remaining registering wheels. All of the said pawls are pivotally mounted upon a transverse rod 96 and each is provided with a rearwardly extending arm 97 having a pendent stud 98 about which one of a series of coil springs is located, the lower ends of said springs engaging a transverse plate 99, so as to normally force the arms 97 upward and hold the pawls down to their work with a yielding pressure. Each of the registering wheels, barring the last which has no gear teeth is further provided on the side opposite from its ratchet wheel with a cam 100, formed with three spaced cam projections 101 equidistant from each other and representing the ends of the respective groups of figures on the wheels. The operating arms 17 which are journaled on the shaft 5 are formed respectively with noses 102 and notches or recesses 103 which latter are adapted to be entered by spring pressed holding pawls 104 mounted on the plate 99. Graduated noses or projections 105 are formed on the said arms 17 and are adapted to be struck by the bar 12 when out of their normal positions to be returned to such normal positions. When one of the wheels 91 has made one-third of a complete revolution, one of the noses of its cam strikes the nose 102 of its respective arm 17 and forces the latter rearward; its pawl 104 holding it in such rear position by passing from one of the notches 103 to the other. Now when the frame 6 is depressed the bar 12 passes forward and contacting with the nose 105 of the arm that has been operated forces said arm forward and causes a spring pressed pawl 106 mounted thereon to move the ratchet wheel 95 of the next wheel one tooth and thus make the transfer. The peculiar graduated construction of the noses 105 is to cause a successive transfer of the different wheels should more than one transfer occur during one operation of the machine, so that the first transfer will be counted in the second transfer and the first and second in the third, etc.

It will be seen from the foregoing description that when it is desired to print a transaction upon the autographic strip which passes over the full width of a transverse table 126 that the lever 51 is first depressed to permit the casing 19, being forced back to operate the lever 44 and release the key frame. The keys are then depressed into the desired key holes of the respective printing wheels and the latter operated to simultaneously bring the correct types into printing positions and turn the register wheels. Lastly the frame 6 is depressed to complete the printing operation by bringing the inked types into contact with the paper strip located below them on the table 126.

It will further be seen by reference to Fig. 3ª that the lateral movement of the printing wheels causes the impression to be made in a column corresponding to the register operated; said columns being suitably lined off and designated as shown so that the cash column occupies a position at the extreme right hand side of the machine immediately over the endless inking ribbon 125 of the check printing device which ribbon is fully described in the aforesaid patent. The check strip which is mounted in any suitable manner within the casing is passed up through a transverse slot 127 formed in the table 126 so as to pass under the ribbon 125 and also under the cash column of the detail strip. It will be seen from this structure all amounts printed in the cash column will also be printed on the check strip and issued from the machine by operating the handle 50ª. The operating handle 50ª as better shown in Figs. 15 and 16 is mounted upon a short shaft 128 which carries a bevel gear 129. This gear meshes with a similar gear 130 mounted on the shaft 131 of a feed roller 132 which is suitably journaled in the frame or casing and coöperates with a companion feed roller 133 to feed the check strip out of the machine when the crank-handle is operated. The rollers 132 and 133 are geared together at one end by inter-meshing gears 134 and 135 so as to move in unison. The shaft 128 also carries a cam 136 which coöperates with a lateral projection formed on a sliding link 137 to move the latter longitudinally. The rear end of the link is pivotally connected to an arm 138 mounted on the shaft 19ᵈ to rock said shaft upon each operation of the crank-handle and thus release the cash drawer through devices hereinafter described. As the handle is only operated when a check is desired it becomes necessary to provide means for releasing the drawer independently of the handle when no check is desired. This means comprises a vertically movable stud 19ª, arranged to be struck and depressed by the casing 19 when the latter is in either of its three left hand positions, and a pivoted lever 19ᵇ mounted on the under side of the plate 1 and arranged to be struck and operated by the lower end of said stud. This lever 19ᵇ engages and operates a lever 19ᶜ, which latter is rigidly mounted on the extended roller shaft 19ᵈ. This shaft 19ᵈ carries a rigid arm 19ᵉ which engages a pivoted lever 19ᶠ which in turn carries a latch plunger 19 for the drawer 19ᵏ. By this means whenever the casing 19 is moved to register upon the Received on account, Paid out, or Charge counters, the cash drawer is released without issuing a check as the check has not been printed with the amounts of these transactions but when the casing is moved to the cash position the amount is printed on the check strip and the latter is issued and the drawer released by operating the handle 50ᵃ as aforesaid.

The detail strip is fed from a supply roller 140, up over the table and down to a feed roller 141 which latter is provided with a ratchet wheel 142 as better shown in Fig. 3. The ratchet wheel is engaged by a feed pawl 143 pivoted upon the upper end of the pivoted lever 144. The lever 144 is normally drawn forward at its lower end into contact with the cash drawer 19ᵏ by a coil spring 145. By this means when the cash drawer is opened and closed the lever 144 is operated and through the pawl and ratchet feeds the detail or autographic strip forward.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

Having thus described my invention what I claim as new and desire to secure by Letters Patent is:

1. In a cash register, the combination with a plurality of independent registering mechanisms each comprising denominational elements, of a movable frame adapted to be brought into alinement with any one of said mechanisms, a series of denominational keys and graduated register operating devices one for each denominational element in a register mechanism coöperating therewith and all mounted on said frame and adapted to move therewith and be brought into position to operate one of the registering mechanisms to register any desired amount.

2. In a cash register, the combination with a plurality of independent registering mechanisms, of a movable frame adapted to be brought into alinement with any one of the same and combined printing and registering operating wheels mounted on said frame and arranged to print a detail of each amount registered.

3. In a cash register, the combination with an autographic device, of a series of independent registering mechanisms representing different departments, combined register operating devices and printing means arranged to be moved into alinement with any one of said registering mechanisms so as to operate the same and simultaneously print the amount upon the paper of the autographic device.

4. In a cash register, the combination with a plurality of totalizers each comprising independent denominational elements, of a movable frame with connections for bringing it into alinement with any one of said totalizers, a plurality of operating devices, one for each denominational element in a totalizer mounted in said frame, and connections whereby a single operation of any of said operating devices may cause a differential motion of the corresponding denominational elements of the totalizer.

5. In a cash register, the combination with a plurality of independent registering mechanisms, each comprising a series of registering wheels, of a movable frame, and register operating devices mounted on said frame and arranged to operate any or all of one series of registering wheels to different desired extents at a single operation of the devices.

6. In a cash register, the combination with a plurality of independent registering mechanisms, of an autographic device, and register operating devices arranged to be moved into alinement with any one of the registering mechanisms and printing means operated by said devices to print upon the paper of the autographic device.

7. In a cash register, the combination with a series of independent department registers, of register operating and printing devices arranged to be moved through different degrees of movement and when moved to actuate any one of the department registers to a degree corresponding to the setting movement and devices for supporting a department detail strip in proximity to the printing devices.

8. In a cash register, the combination with a plurality of independent totalizers each including denominational elements, of a movable frame constructed to be brought into alinement with any one of said totalizers, operating devices, one for each denominational element in a totalizer mounted in said frame, and a key for each operating device constructed to be thrown into connection with said operating device.

9. In a cash register, the combination with a plurality of independent totalizers each comprising denominational elements, of a movable frame constructed to be brought into operative alinement with any one of said totalizers, a plurality of printing devices, one for each denominational element in a totalizer mounted on said frame, and constructed to each differentially operate the corresponding denominational element of a totalizer, and keys on said frame for operating said printing devices.

10. In a cash register, the combination with a plurality of independent registering mechanisms, each having operating gears, of a movable frame, gears mounted on the same and adapted to be brought into mesh with the gears of any one of the registering mechanisms, and means for operating the gears on the movable frame.

11. In a cash register, the combination with a plurality of independent registering mechanisms, of a movable frame adapted to be brought into alinement with any one of said mechanisms, printing wheels mounted on said frame and adapted to be brought into engagement with any one of the registering mechanisms and devices for turning said wheels the proper distances according to the amount to be registered.

12. In a cash register, the combination with a series of independent totalizing registers, of register operating devices arranged to be shifted bodily and then differentially operated to actuate any one of said registers to a desired degree to add the amount of a transaction thereto, and printing devices actuated by the said register operating devices to print a detail of each amount in an independent department corresponding to the register on which the amount is added.

13. In a cash register, the combination with a plurality of independent registering mechanisms, of a depressible frame, a movable frame mounted on said depressible frame so that it may be brought into alinement with any one of said registering mechanisms, and printing devices mounted on said movable frame and adapted to operate the registering mechanisms.

14. In a cash register, the combination with an autographic register having a movable strip of paper, of a registering mechanism, a depressible frame mounted over said strip and amount printing devices mounted on said frame and also engaging the registering mechanism to record thereon the amount printed on the strip.

15. In a cash register, the combination with an autographic register having a movable exposed strip of paper, of a registering mechanism, a depressible frame mounted over a portion of said strip, a plurality of printing wheels mounted on said frame and adapted to engage said registering mechanism, and means for turning said printing wheels the desired distances.

16. In a cash register, the combination with a registering mechanism, of rotatable type wheels engaging said registering mechanism, independent keys for actuating the respective wheels, and means for rocking the type wheels out of engagement with the registering mechanism and into engagement with paper to print thereon.

17. In a cash register, the combination with an autographic register having a movable strip of paper which may be written upon, of a registering mechanism, a movable frame mounted in proximity to said strip, and amount printing devices mounted on said frame and adapted when set to transmit a corresponding degree of movement to the registering mechanism.

18. In a cash register, the combination with a plurality of independent totalizers, each comprising denominational elements, of a movable frame constructed to be brought into operative alinement with any one of said totalizers, operating devices mounted on said frame in banks, one bank for each denominational element in a totalizer, and constructed to each engage and communicate differential movement to the denomination element in alinement therewith.

19. In a recording device, the combination with a frame, rotatable type wheels mounted on said frame, keys normally out of engagement with said wheels and means for locking said keys directly to said wheels at any desired point so that the operation of the keys will rotate the wheels to the desired extent.

20. In a recording device, the combination with a frame, rotatable type wheels mounted on said frame, keys adapted to engage said wheels and means for automatically disengaging said keys from said wheels.

21. In a cash register, the combination with a plurality of independent totalizers, each comprising denominational elements, of a movable frame constructed to be brought into alinement with any of said totalizers, operating devices, one for each denominational element in a totalizer, and key means on said frame for giving simultaneous differential movement to all denominational elements in a totalizer.

22. In a recording device, the combination with a movable frame, of a printing mechanism mounted on said frame, and a plurality of indicating tablets adapted to be operated respectively by the movable frame according to its position.

23. In a cash register, the combination with a plurality of independent registering mechanisms, of a movable frame arranged to be brought into alinement with any one of said mechanisms, register operating devices arranged in banks upon said frame and a series of keys for operating each of said banks to the desired extent.

24. In a recording device, the combination with a series of independent registers, of a movable frame arranged to be brought into alinement with any one of said registers, graduated operating devices mounted on said frame and adapted to register any desired amount and indicators arranged to be raised by said operating devices.

25. In a cash register, the combination with a plurality of independent registering mechanisms, of a sliding carriage adapted to be brought into alinement with any one of said registering mechanisms, and graduated register operating devices mounted on said carriage and adapted to operate any one of said registering mechanisms to register the desired amount.

26. In a cash register, the combination with a plurality of independent registering mechanisms, of a movable frame arranged to be brought into alinement with any one of said mechanisms, and printing devices mounted on said frame and adapted when set to transmit a corresponding degree of movement to the registering mechanism with which they are in alinement.

27. In a cash register, the combination with a depressible frame, of type wheels mounted on said frame, operating keys for the type wheels also carried by the frame, and arranged to turn the type wheels different distances according to the degree of movement of the key, and an inking device arranged to be passed over the types upon the depression of the frame.

28. In a cash register, the combination with a plurality of independent registering mechanisms pivoted indicating tablets, pendent bars connected to said tablets for operating the same, a movable frame carrying register operating devices and operating devices mounted on said frame and adapted to be brought into engagement with any one of said bars so that when the devices are actuated the indicator tablet will be raised.

29. In a cash register, the combination with register wheels, rotatable type wheels adapted to mesh with the same, means whereby said type wheels are moved when in mesh with the registering wheels and devices supporting said type wheels whereby they may be withdrawn from engagement with the register and depressed to make an impression.

30. In a cash register, the combination with a plurality of registering mechanisms, of a movable frame arranged to be brought into alinement with any one of the same, a plurality of printing wheels mounted in said frame, a swinging key frame also mounted in said first mentioned frame and keys mounted on said key frame and adapted to engage the respective wheels for operating the same.

31. In a cash register, the combination with a depressible frame, of locking means for normally holding the same in an elevated position, a printing mechanism, a key frame adapted to release the locking means when operated, and keys mounted on said key frame and arranged to operate the printing mechanism.

32. In a cash register, the combination with a registering mechanism, of a movable frame, register operating wheels mounted on said frame, movable keys mounted in proximity to said wheels, locking slides on said wheels for locking the keys thereto and means for operating said slides to disengage said keys.

33. In a cash register, the combination with a plurality of independent registering mechanisms, a movable frame adapted to be brought into alinement with any one of the registering mechanisms, printing wheels mounted on said frame and arranged to engage any one of the registering mechanisms, and means for bringing a paper strip and the printing wheels together.

34. In a cash register, the combination with a registering mechanism, of type wheels, and a movable frame supporting said wheels and adapted to throw them either into engagement with the registering mechanism or into contact with a paper strip.

35. In a cash register, the combination with a registering mechanism, of a plurality of wheels arranged to operate the same, a movable key frame and keys mounted in and carried by said frame and adapted to operate the wheels independently of each other to any extent desired.

36. In a cash register, the combination with a frame carrying type wheels, means for moving said frame to print from said type wheels, of movable indicators and means whereby an indicator is set to exposed position upon the printing movement of said frame.

37. In a cash register, the combination with a registering mechanism, comprising a plurality of wheels having gear teeth, of a depressible frame, printing wheels mounted on said frame and formed with gear teeth arranged to mesh with the gears of the registering mechanism, and keys for operating said wheels.

38. In a cash register, the combination with a plurality of registering mechanisms, of a movable frame adapted to be brought into alinement with any one of said mechanisms, register operating devices mounted on said frame, a stop frame for normally preventing the operating devices engaging any of the registering mechanisms and means for withdrawing said stop frame at will.

39. In a cash register, the combination with an autographic device, a cash drawer, a registering mechanism and devices controlled by the registering mechanism and arranged to release the drawer independently of the operation of the autographic devices.

40. In a cash register, the combination with an autographic device, a cash drawer for operating the same and a register device adapted to release said drawer only for certain transactions.

41. In a cash register, the combination with an autographic device, a cash drawer for the same, a printing device arranged to release said drawer for certain operations and means for releasing said drawer independently of the printing device during other operations.

42. In a cash register, the combination with a plurality of independent registering mechanisms, of register operating devices adapted to operate any one of said registering mechanisms to any desired extent at a single operation, and arranged to be moved and thus brought into alinement and operative connection with any one of said mechanisms.

43. In a cash register, the combination with an autographic device, of a series of independent registering mechanisms representing different departments, and combined register operating devices and printing means arranged to register in any one of said registering mechanisms and print in a corresponding section of the autographic device.

44. In a cash register, the combination with an autographic device having different departments, of a series of independent registering mechanisms representing different departments and combined register operating devices and printing means arranged to print and register in any desired department.

45. In a cash register, the combination with a series of independent registering mechanisms, of combined register operating and printing devices, a special key and means for preventing the operation of said devices to actuate any one of the registering mechanisms and print the amount until the special key is operated.

46. In a cash register, the combination with a series of independent registering mechanisms, of a single registering operating device arranged to be moved to coöperate with any one of said mechanisms, a special key and means for preventing the operation of said devices to actuate any one of the registering mechanisms until the special key is operated.

47. In a cash register, the combination with a registering mechanism, of type wheels, a movable frame supporting said wheels and adapted to throw them either into engagement with the registering mechanism or into contact with a paper strip, and transfer devices for the registering mechanism arranged to be actuated by the movement of the type wheels toward the paper strip.

48. In a cash register, the combination with an autographic device, of a movable frame carrying type wheels adapted to print in different sections of the autographic device, indicators and means whereby an indicator corresponding to the section in which the printing is being done, is raised.

49. In a cash register, the combination with a series of independent registering mechanisms, of a movable frame arranged to be brought into alinement with any one of said mechanisms, graduated register operating devices mounted on said frame, and a series of indicators adapted to be actuated according to the register which receives the last amount registered.

50. In a cash register, the combination with a plurality of totalizers, each including denominational elements, of a movable frame constructed to be brought into operative alinement with any of said totalizers, a series of keys of different denominations mounted on said frame with connections whereby each denomination of the keys may engage and actuate the corresponding denominational element of the totalizer to differential extents.

51. In a cash register, the combination with a plurality of independent registering mechanisms, of a movable frame adapted to be brought into alinement with any one of said mechanisms, a series of register operating devices mounted on said frame, and a series of keys also mounted on said frame and arranged to be coupled to and operate said devices to any desired extent.

52. In a cash register, the combination with a registering mechanism, of a depressible frame, combined register operating and printing devices mounted on said frame and a latch for the depressible frame arranged to hold the same in position until after the register operating devices have operated the register.

53. In a cash register, the combination with a registering mechanism, of register operating wheels, locking slides on said wheels, movable keys arranged to be locked to the wheels by said slides, and means for operating said slides to disengage the keys.

54. In a cash register, the combination with an autographic device adapted to issue a check, of a device for printing the amount of each transaction on a paper strip but only the amounts of special transactions upon checks.

55. In a cash register, the combination with an autographic device arranged to issue a check, a cash drawer arranged to be released by the check device, a device for printing upon the autographic strip, and means coöperating with said printing device for releasing the drawer.

56. In a cash register, the combination with an autographic device, of a register, a series of wheels having register operating gears and printing types, key locking slides mounted on said wheels, and a series of keys arranged to be locked to said wheels at any desired point by said slides.

57. In a cash register, the combination with a registering mechanism, of a movable frame, register operating and printing devices mounted on said frame, a rock frame, transfer devices arranged to be operated by said latter frame, and means for actuating said rock frame during a part of the movement of the movable frame.

58. In a cash register, the combination with a registering mechanism, of a movable frame, a register operating and printing device mounted on said frame, a latch for holding said frame in connection with the registering mechanism until a registration has been made and then releasing the same so that it may be depressed.

59. In a cash register, the combination with a registering mechanism, of a series of operating devices, a series of keys, latching slides for coupling said keys to said devices, and means for operating said slides to release the keys after the operating devices have registered the amount.

60. In a cash register, the combination with a series of independent registering mechanisms, of a movable frame, register operating devices mounted on said frame, means for normally holding said operating devices out of connection with all of the registering mechanisms and a key for moving said holding means so that the operating devices may engage any one of the registering mechanisms.

61. In a cash register, the combination with operating devices, of a series of pivoted indicators each of which is formed with a cam extension, and a movable bar having locking projections arranged to coöperate with said cam extensions.

62. In a cash register, the combination with a series of independent registering mechanisms, of a movable frame, register operating devices mounted on said frame, a pivoted bar arranged to normally hold said devices out of connection with the registering mechanisms and an independent device for tipping said bar to allow said devices to move into connection with any one of the operating mechanisms.

63. In a cash register, the combination with a series of independent registering mechanisms, of a movable frame arranged to be brought into alinement with any one of the same, register operating devices mounted on said frame, a notched bar for preventing the engagement of the operating devices and registering mechanisms only when in proper alinement, and a rock bar for normally preventing such engagement at any point.

64. In a cash register, the combination with a plurality of independent registering mechanisms each including denominational elements, of a movable member arranged to be brought into alinement with any one of said mechanisms, a series of register operating devices mounted on said member and constructed to move therewith and be brought into position to operate any one of the registers to register simultaneously the desired amount thereon on all the denominational elements thereof.

65. In a cash register, the combination with a plurality of independent registering mechanisms, of a movable frame arranged to be brought into alinement with any one of said mechanisms, and combined printing and register operating devices mounted on said frame.

66. In a cash register, the combination with an autographic device, of a registering mechanism, a movable frame, and devices mounted on said frame for printing on the autographic device and also operating the registering mechanism.

67. In a cash register, the combination with a plurality of independent registering mechanisms each having denominational elements, of a series of indicators, one for each mechanism, a movable member arranged to be brought into alinement with any one of the registering mechanisms, a series of graduated register operating devices mounted on said member so that they may be brought into alinement with the denominational elements of the proper registers, and means for actuating the indicators by the movement of said member.

68. In a cash register, the combination with a plurality of registering mechanisms, of a detail strip divided into columns, one for each register, and a combined register actuator and detail strip printer arranged to be moved from one to the other of said registers and thereby be brought into a proper relation to the detail strip.

69. In a cash register, the combination with an autographic mechanism having a record strip which is partially exposed to permit of writing thereon, of a series of registering mechanisms and register operating devices constructed to print upon the autographic strip.

70. In a cash register, the combination with a plurality of registering devices and transfer devices therefor, of common operating devices for same having printing types thereon, keys for actuating said devices, and mechanism manually operable to move said printing types to take an impression therefrom and to operate said transfer devices.

71. In a cash register, the combination with a plurality of registering devices, of operating devices for same manually adjustable to coöperative relation with any desired registering device, printing devices carried by and movable with said operating devices, means for actuating said operating devices, and means for taking an impression from said printing devices.

72. In a cash register, the combination with a registering device, of operating devices for same, keys for operating said devices, and means controlled by said keys for withdrawing said operating devices from said registering device at the end of the stroke of said keys.

73. In registering mechanism, the combination with a plurality of registering devices each comprising a set of denominational elements, of common actuating devices for said registering devices including manually operable keys for each denominational element in a registering device, and a carriage on which said operating devices and keys are mounted movable to bring said devices simultaneously in operative relation with all the denominational elements of any of said registering devices.

74. In registering mechanism, the combination with a plurality of registering devices each having a set of denominational elements, of operating devices for same including numeral keys and movable to bring said devices into coöperative relation with any of said registering devices, and printing devices movable with and controlled by said keys.

75. In registering mechanism, the combination with computing devices comprising denominational elements, of operating mechanism for same including numeral keys, a carriage on which said operating mechanism and keys are mounted and movable from one element to another, and printing devices movable with and controlled by said numeral keys.

76. In a cash register, the combination with a registering mechanism, of operating racks for same, a pivoted frame in which said racks are mounted, means normally preventing said racks from gearing with the registering mechanism, and a key and connections for withdrawing said means, to allow said racks to engage said registering mechanism.

77. In a cash register, the combination with a plurality of sets of independent counter wheels, of a frame constructed to be moved into alinement with any set of said wheels, and register operating devices mounted on said frame with connections for moving any set of counter wheels to different desired extents by a single operation of said operating devices.

78. In a registering mechanism, the combination with a plurality of totalizers, each comprising a series of wheels, and a common supporting shaft for all said wheels, of a totalizer operating mechanism, comprising a plurality of denominational elements, one for each wheel in a totalizer, connections permitting a sliding relative lateral movement between said totalizers and said totalizer operating mechanism, whereby any series of totalizer wheels may be operatively alined with said operating mechanism, and means for actuating said totalizer operating mechanism to differential extents.

79. In a registering mechanism, the combination with a totalizer operating mechanism, of a plurality of totalizers each comprising a series of wheels, a common supporting shaft for all of said wheels, means for establishing an operative relation between said totalizer operating mechanism and any series of totalizer wheels and means for giving said totalizer operating mechanism differential movement to actuate said totalizer wheels differentially.

80. In a registering mechanism, the combination with a plurality of totalizers, each comprising a series of wheels, of a totalizer operating mechanism including a plurality of denominational elements, connections permitting the forming of an operative relation between said operating mechanism and any series of totalizer wheels, and a printing mechanism constructed to print amounts in a manner rendering them identifiable with the series of totalizer wheels employed.

81. In a registering mechanism, the combination with a plurality of totalizers, each comprising a series of wheels axially alined, of a totalizer operating mechanism comprising gear segments equal in number to the wheels of any totalizer, connections permitting relative axial movement between said series of wheels and their said operating segments, whereby any desired series of wheels may be alined with the operating segments, and means for separately rotating said operating segments to different desired extents.

82. In a registering mechanism, the combination with a supporting shaft, of a plurality of totalizers each including a series of wheels, and all axially alined on said shaft, of a second supporting shaft, a totalizer operating mechanism comprising gear segments mounted on said second shaft, connections permitting sliding relative lateral movement between said totalizer wheels and their said operating segments, whereby any desired series of wheels may be alined with said gear segments, means for separately rotating said segments to different desired extents, and means for moving one of said shafts toward and away from said other shaft, whereby to engage and disengage said totalizers and said operating segments.

83. In a registering mechanism, the combination with a supporting shaft, of a plurality of totalizers each comprising a series of denominational elements and all axially alined on said shaft, a second supporting shaft, a plurality of totalizer operating elements comprising gear segments axially alined on said second shaft, connections permitting sliding relative lateral movement between said totalizers and their said operating segments, whereby any desired series of wheels may be alined with said segments, means for separately rotating said gear segments to different desired extents, and printing segments operatively connected with said gear segments.

84. In a registering mechanism, the combination with printing segments, of differentially movable gear segments operatively connected therewith, duplicate totalizers mounted for alternate engagement with said gear segments, shafts on which said gear segments and said totalizers respectively are mounted, with connections permitting sliding relative lateral movement between said totalizers and said gear segments, whereby any desired totalizer may be engaged with said gear segments, and means for taking printed impressions from said printing segments in a manner identifiable with the selected totalizer.

85. In a registering mechanism, the combination with a plurality of totalizers, each including a series of denominational elements, all axially alined, of totalizer operating devices comprising differentially movable gear segments, also axially alined, connections permitting sliding collective relative movement laterally between said totalizer elements and said gear segments, whereby to cause operative alinement of any desired totalizer with said operating segments, means for engaging and disengaging said totalizers and said gear segments, and keys for determining the differential movement of said operating gear segments.

86. In a registering mechanism, the combination with a plurality of totalizers, each comprising a series of denominational elements, all mounted in lateral alinement, of differentially movable totalizer operating elements also mounted in lateral alinement, connections permitting sliding collective relative lateral movement between said totalizers and their operating elements, to provide an operative alinement of any one of said totalizers with their said operating elements, keys for determining the extent of differential movement of said operating elements, and type-carrying devices operatively connected to said operating elements.

87. In a registering mechanism, the combination with a plurality of totalizers, each comprising a series of denominational elements, of totalizer operating mechanism including denominational elements corresponding in number to the denominational elements in a totalizer, connections permitting sliding relative lateral movement between said totalizer elements and their said operating elements, whereby to attain operative alinement of any desired totalizer with said operating mechanism, printing devices operatively connected to said totalizer operating elements, and means for giving differential actuating movement to said totalizer operating elements.

88. In a registering mechanism, the combination with a plurality of totalizers, each including a series of denominational elements, with means for supporting them in lateral alinement, of totalizer operating mechanism comprising differentially movable gear segments, connections permitting sliding relative lateral movement between said totalizer elements and their said operating segments, whereby to attain operative alinement of any desired totalizer with said gear segments, means for causing differential rotation of said operating gear segments, and devices for engaging said totalizer elements and said gear segments for said differential movement in one direction.

89. In a registering mechanism, the combination with a plurality of totalizers each comprising a series of denominational elements, all mounted in lateral alinement, of differentially movable totalizer operating elements also mounted in lateral alinement, connections permitting collective relative lateral movement between said totalizers and their operating elements to provide an operative alinement of any one of said totalizers with their said operating elements, means for engaging and disengaging any of said totalizers and their operating elements, manipulative devices, for determining the differential movements of said operating elements, and type carriers operatively connected to said operating elements.

90. In a registering mechanism, the combination with a plurality of totalizers, each comprising a series of denominational elements, and a laterally extending rod on which all said elements are mounted in alinement, of a plurality of differentially movable totalizer operating racks also mounted in lateral alinement, connections permitting collective relative lateral movement between said totalizers and their said operating racks, means for causing to and fro relative movement between said totalizers and their operating racks thereby producing engagement of said totalizers and said racks for movement thereof together, keys for determining the extent of differential movement of said operating racks, devices carrying printing type and movable in both directions with said operating racks, and connections for forcing said type against a record material.

91. In a registering machine, the combination with a plurality of totalizer operating racks mounted side by side in lateral alinement and a plurality of totalizers each comprising a series of denominational elements each series having as many elements as there are operating racks, a rod on which said elements are all mounted side by side in lateral alinement, connections permitting collective relative movement parallel to said rod between said totalizers and their said operating racks, whereby all the denominational elements of any desired totalizer may confront the operating racks simultaneously, means for producing engagement and disengagement of said racks and said totalizers whereby to drive the selected totalizer by the racks, means for giving said operating racks differential extents of movements, devices carrying type and movable in both directions by said operating racks, and means for forcing said type against a record material.

92. In a registering mechanism, the combination with a totalizer operating mechanism, of a plurality of totalizers each comprising a series of wheels, a common supporting shaft for all of said wheels, means for establishing an operative relation between said totalizer operating mechanism and any series of totalizer wheels, means for giving said totalizer operating mechanism differential movement to actuate said totalizer wheels differentially, and means for preventing the engagement of the operating mechanism and totalizer except when the same are in proper alinement.

93. In a machine of the class described, the combination with a plurality of totalizers, each comprising a series of wheels, of an operating mechanism including a plurality of denominational elements, connections permitting the forming of an operative relation between said operating mechanism and any series of totalizer wheels, and a printing mechanism constructed to give a segregated list of the items entered in the various totalizers for the purpose described.

94. In a machine of the class described, the combination with a plurality of totalizers, each comprising a series of wheels, of an operating mechanism including a plurality of denominational elements, connections permitting the forming of an operative relation between said operating mechanism and any series of totalizer wheels, and a printing mechanism constructed to give a segregated list upon a record strip of the items entered on the various totalizers for the purpose described.

In testimony whereof I affix my signature in the presence of two witnesses.

JOSEPH P. CLEAL.

Witnesses:
WILLIAM MUZZY,
ALVAN MACAULEY.

---

Copies of this patent may be obtained for five cents each, by addressing the "Commissioner of Patents, Washington, D. C."